UNITED STATES PATENT OFFICE.

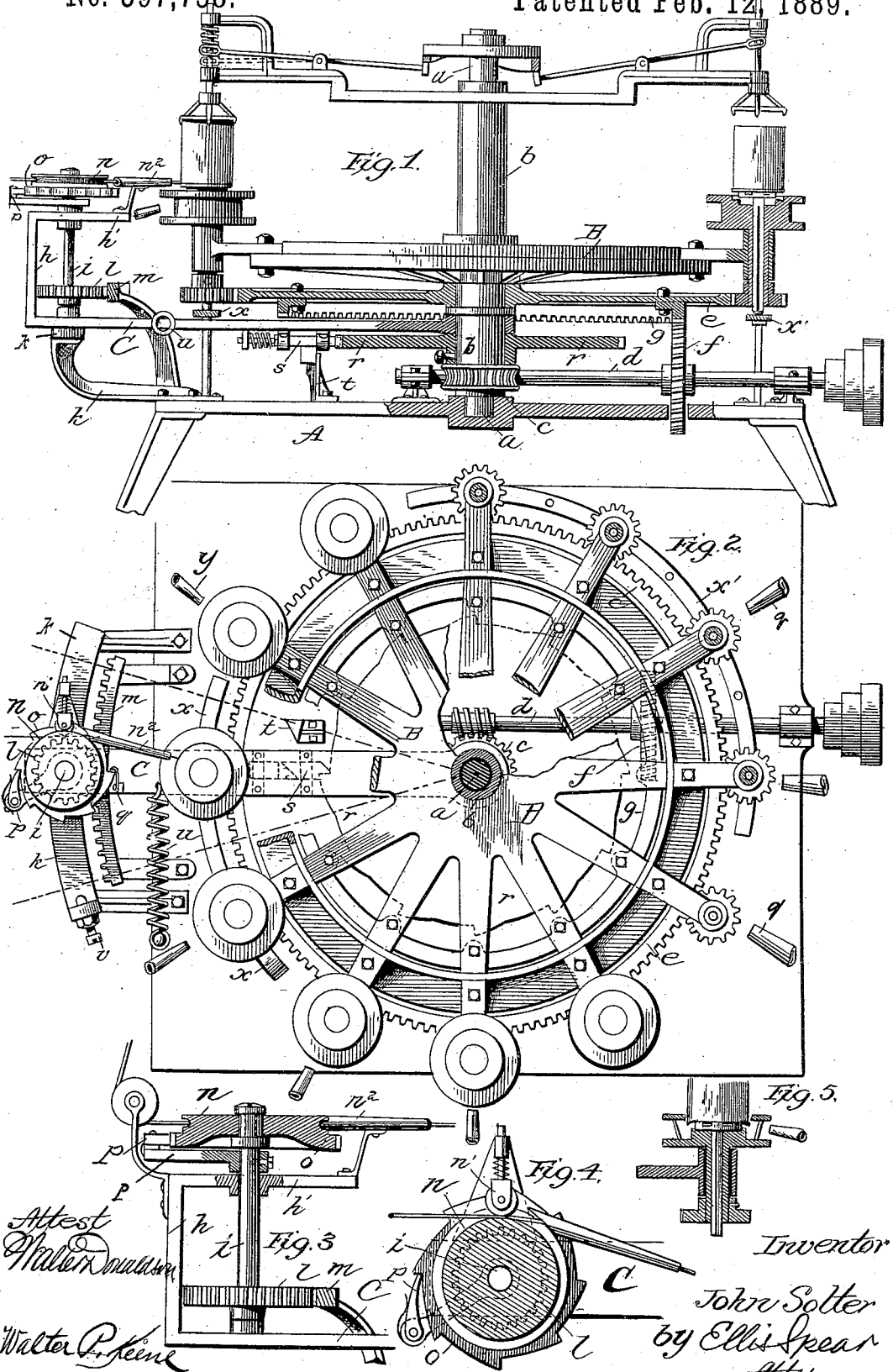

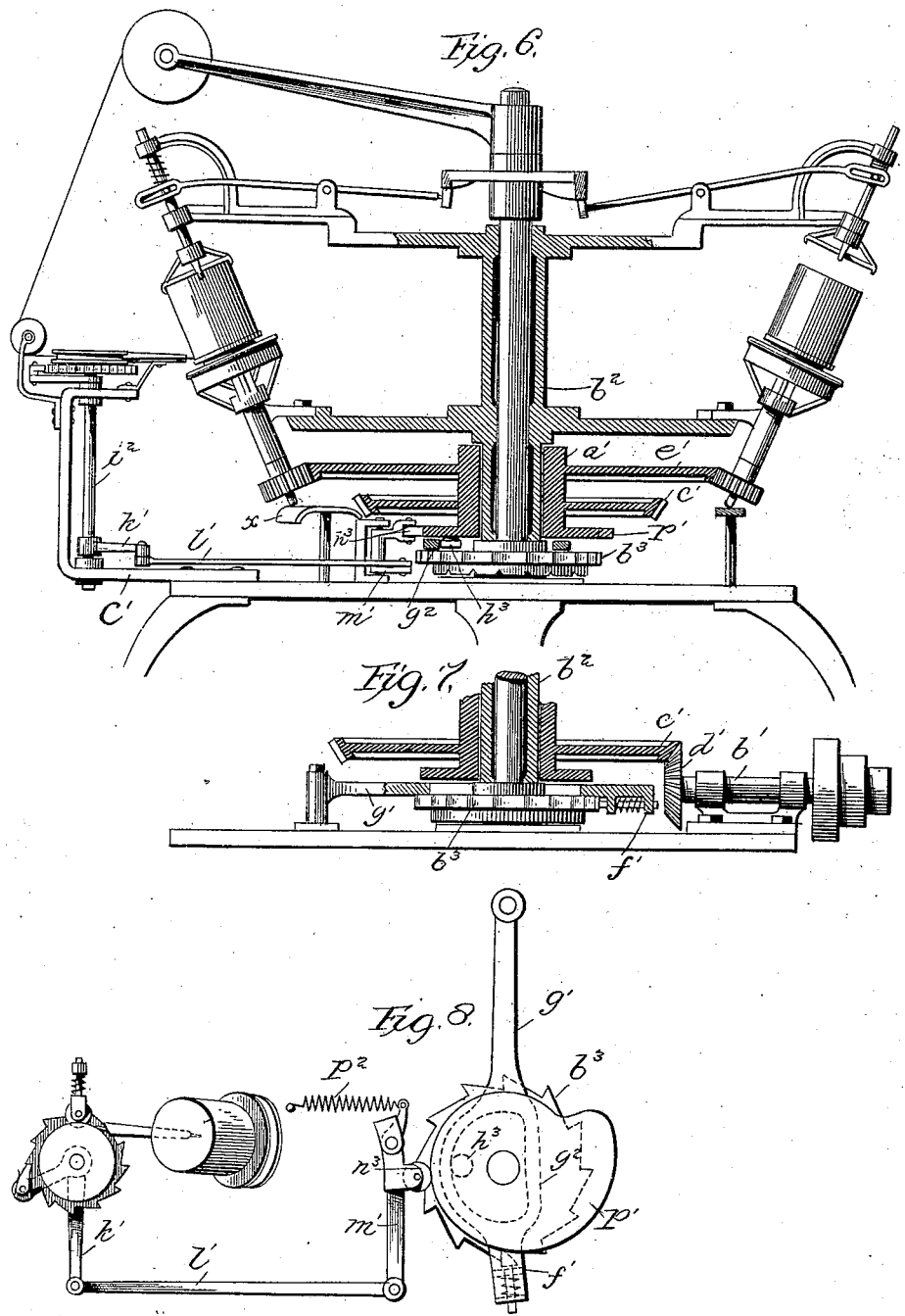

JOHN SOLTER, OF BALTIMORE, MARYLAND.

SOLDERING-MACHINE.

SPECIFICATION forming part of Letters Patent No. 397,758, dated February 12, 1889.

Application filed December 7, 1888. Serial No. 292,865. (No model.)

*To all whom it may concern:*

Be it known that I, JOHN SOLTER, of Baltimore, in the State of Maryland, have invented a new and useful Improvement in Soldering-Machines; and I do hereby declare that the following is a full, clear, and exact description of the same.

The present invention has for its object principally the feeding of solder to cans for outside soldering. It is shown in part in connection with a machine which is improved not only as to the parts immediately connected with the feeding of the solder, but also in the mechanism for rotating the can-seats, which is a modification of the endless belt shown in Letters Patent granted to me on the 24th of July, 1888, No. 386,759. I have also shown my feeding devices in connection with a machine in which the table supporting the can-seats has a step-by-step movement.

In the drawings, Figure 1 shows a part of the apparatus in side elevation and a part in central vertical section with means for rotating the table continuously. Fig. 2 is a plan view of the same, some of the parts being in section, some omitted, and others broken away. Figs. 3, 4, and 5 represent details. Fig. 6 is an elevation, partly in section, of the invention as applied to an intermittently-moving table; and Figs. 7 and 8 are details relating to the form of apparatus shown in Fig. 6.

In Figs. 1 and 2, A represents a suitable table in which is seated a post, $a$, provided with a sleeve, $b$, fitted to turn thereon. A worm-gear, $c$, on the sleeve receives motion from a worm on the end of a shaft, $d$, which is connected with the driving-power. The sleeve carries a table, B, secured thereto and moving therewith, and this table supports the brackets which hold the can-seats and their spindles.

The parts thus far described are identical with similar parts described in my patent referred to. Instead, however, of driving the can-carriers by an endless belt or band, I substitute for the pulley on the lower end of the can-carrier a gear-wheel and give the carriers rotary movement independent of the movement of the table through a wheel, $e$, having teeth on its periphery, which mesh in the teeth of the small gears on the lower ends of the carriers. This wheel $e$ is driven from a gear-wheel, $f$, on the shaft $d$, which meshes with an annular gear shown at $g$, being on the under surface of the said wheel.

The can-carriers may be provided with the solid seats shown in Fig. 1 or the open seats, as shown in Fig. 5, in which the flame plays directly against the edge of the can.

Holders for the upper part of the can and cam-disks for releasing the can at the required points, to allow of the discharge of the same like those in the patent referred to are shown in the present case.

The feeding devices for the solder I will now describe.

An arm, C, extends from the sleeve $b$, upon which it is pivoted, to beyond the line of the can-carriers at one point, and this arm is provided with a vertical part, $h$, and an inwardly-extending arm, $h'$, running parallel with the arm proper. These parallel parts of the arm provide bearing for a vertical shaft, $i$. The outer end of the arm C is supported by a bracket, $k$, extending from the table, the arm C bearing upon the plate of the bracket. The shaft $i$ carries a gear-wheel, $l$, near its lower end, which meshes in the teeth of the rack $m$, supported by the table. The arm C is given movement back and forth within limits indicated by the supporting-bracket $k$ by means hereinafter described, and in this back-and-forth movement the vertical shaft $i$ is rotated by the meshing of its gear-wheel in the teeth of the stationary rack.

On the upper end of the shaft $i$ is mounted loosely a pulley, $n$, which has a grooved periphery to receive the solder-wire to be fed to the can, and upon a bracket extending from the arm $h'$, I support a spring-pressure wheel, $n'$, in line with the pulley and adapted to keep the solder pressed into the groove, and thus cause it to be fed along as the pulley is rotated.

Connected to the pulley and made a part thereof is a ratchet-wheel, $o$, and a pawl, $p$, pivoted to an arm, $p'$, secured to the shaft $i$, is adapted to engage said ratchet-wheel. When the shaft $i$ is revolved by the rack $m$ as the arm C moves forward, the pulley $n$ will be rotated and the solder fed forward through a tube, $n^2$, carried by the arm $h'$. In the backward movement of the arm C the pawl slips over the ratchet-teeth without moving the pulley, and to prevent accidental movement on the return of the arm a stop-pawl may be used. The arm C is moved by means of a disk, $r$, secured to the sleeve $b$, and provided on its periphery with ratchet-teeth. The arm C is provided on its under face with a spring-latch, $s$, having an inclined rear face, and the end of this latch is directly in the path of the disk $r$. As the disk is rotated, a tooth engages the end of the latch $s$, and in the continued movement of the disk the arm is carried with it, which constitutes the forward movement of the arm. This movement is checked, however, by the inclined rear face of the latch coming in contact with an inclined stop, $t$, which forces the latch back until it is out of the path of the teeth of the disk, when a spring, $u$, immediately returns it to normal position.

The movement of the arm may be limited by a set-screw, $v$, at the end of the bracket $k$. After the can is presented to the heating-tubes a spindle connected to a disk on which the can is seated rides upon a cam-track, $x$, which lifts the can sufficiently to allow the solder-feeding devices to apply the solder to the bottom seam of the can. The ordinary cooling-tubes, $q$, are used on the opposite side of the solder-station.

In Figs. 6, 7, and 8 I have shown the feeding devices modified to meet the requirements of a machine provided with an intermittently-moving table such as that shown in Letters Patent No. 234,948, of November 30, 1880, to W. D. Brooks.

In Fig. 6 a machine of this general character is shown, the can-seats receiving continuous rotation on their own axis through a sleeve, $a'$, driven from a counter-shaft, $b'$, through bevel-gears $c'$ $d'$. A second gear, $e'$, meshes with gears on the ends of the can-seats, and thus the said seats are continuously revolved. The intermittent movement of the table secured to the sleeve $b^2$ is effected through a ratchet-wheel, $b^3$, on the said sleeve, operated by a pawl, $f'$, carried on the end of a pivoted arm, $g'$.

Between the end of the arm carrying the pawl and the pivot a loop, $g^2$, is formed in the arm, of cam-shape, and a friction-roller, $h^3$, carried on the under face of the sleeve $a'$, or on a disk formed with said sleeve, extends into the interior of the loop and bears against its inner periphery. The shape of the loop is such that in the continuous movement of the sleeve $a'$ its roller moves the pivoted arm, with the pawl, positively to the rear, where it engages with the teeth of the ratchet-wheel, and in the continuous movement of the sleeve the roller positively moves the lever forward, which causes the ratchet-wheel to revolve, thus moving the table and the can-seat carrier thereby. This movement is effected once during every revolution of the sleeve $a'$, and the amount of movement may be regulated by the form of the cam-loop, so as to make the table move each time a distance equal to the space between the stations.

The solder-feeding devices are the same as described in connection with the other form of machine; but instead of providing for their oscillation to follow the continuous movement of the table during their operation the devices are mounted upon a stationary arm, $C'$, and in place of the gear and rack for rotating the shaft $i^2$, I secure an arm to said shaft, as at $k'$, which is operated through a connecting-rod, $l'$, secured to one end of a pivoted lever, $m'$. A roller, $n^3$, projects from the inner face of this lever in the path of a cam, $p'$, formed by the periphery of a disk on the sleeve $a'$. This cam causes the rotation of the shaft $i'$ and the feeding of the solder. After the lever $m'$ is moved by the cam a spring, $p^2$, returns it.

It will be understood that the revolving table may represent an endless belt or any kind of moving support for the can-carriers.

After the can has been raised from its seat by the track $x$ and the solder has been applied the can drops back into its seat as the table continues revolving, and is then subjected to the flame from burner $y$, Fig. 2. The solder is thus thoroughly applied to the seam and permitted to distribute itself evenly therein. The continued revolution of the table causes the raising of the can-seat again when the track $x'$ is reached, and the can at this point is allowed to cool previous to being discharged.

What I claim is—

1. In combination with a revolving table carrying a series of revolving can-carriers, solder devices arranged in proximity to the line of movement of the carriers, a tube for directing the solder to the can, feeding devices for the solder, vertically-movable can-seats for the cans, and a cam-track opposite the solder devices for raising the can-seats to present the edge of the can to the solder-tube, substantially as described.

2. In combination with a revolving table carrying a series of revolving can-carriers, an oscillating arm, solder-feeding devices carried by said arm, intermediate connections between the main driving-shaft and the arm for moving the same, and intermediate connections between the table of the machine and the feeding devices for operating the same, substantially as described.

3. In combination with a revolving table carrying a series of revolving can-carriers, an oscillating arm supported from and operated by the machine, solder-feeding devices carried on said arm, a vertical shaft for operating the feeding devices, and rack-and-gear connections between said shaft and a stationary part of the frame, whereby said shaft is rotated in the oscillation of the arm, substantially as described.

4. In combination with a revolving table carrying a series of revolving can-carriers, an oscillating arm, means for oscillating said arm in the movement of the machine, a vertical shaft carried by the arm, rack-and-gear connections for said shaft, whereby it is rotated in the oscillation of the arm, a solder-feeding pulley carried loosely by said arm, and pawl-and-ratchet connections between the shaft and pulley, whereby the solder is fed in the oscillation of the arm in its forward movement only, substantially as described.

5. In combination with the table and carriers thereon, an oscillating arm, a vertical shaft carried thereby, rack-and-gear connections for moving said shaft, a pulley carried loosely by the shaft, pawl-and-ratchet connections between the shaft and pulley, and a spring pressure-roller for keeping the solder pressed against the periphery of the pulley, whereby it is fed forward in the rotation of the pulley, substantially as described.

6. In combination with the table and the carriers thereon, an oscillating arm, bearings on its outer end for a vertical shaft, a bracket for supporting the end of the arm, a rack on the table in mesh with a gear on the vertical shaft, a feed-pulley on the upper end of the shaft, and a pawl-and-ratchet connection between the shaft and pulley, substantially as described.

7. In combination with the table and carriers thereon, an oscillating arm carrying solder-feeding devices operated by the oscillation of said arm, means for retracting said arm, and a pawl-and-ratchet connection between said arm and a revolving part of the machine for moving the arm in one direction, substantially as described.

8. In combination with the table and can-carriers thereon, an oscillating arm carrying solder-feeding devices operated by the forward movement of the said arm, a pawl-and-ratchet connection between said arm and the driving-power for moving the arm in one direction, and a spring for returning said arm, substantially as described.

9. In combination with the table and can-carriers thereon, an oscillating arm carrying solder-feeding devices, a sleeve, $b$, the ratchet-wheel carried thereby, and a pawl on the oscillating arm projecting into the path of the ratchet-wheel, whereby the said arm is carried forward by said ratchet, and means for retracting said arm, substantially as described.

10. In combination with a table and can-carriers, the sleeve for driving the parts, a ratchet-wheel carried thereby, an oscillating arm carrying solder-feeding devices, a spring-pawl on the arm adapted to engage with the ratchet-wheel, a releasing-stud on the table for releasing said pawl from the ratchet, and means for retracting said arm, substantially as described.

11. The combination, in a soldering-machine, of a central supporting-post, a sleeve thereon, said sleeve being driven from a main driving-shaft, a table connected with and driven by said sleeve, can-carriers supported from said table, gears on the lower ends of said carriers, a gear-wheel loosely mounted on the sleeve and driven from the main shaft, heating means for the cans, and solder devices, with means for automatically feeding solder to the cans, a raised cam-track in front of the solder devices for lifting the supporting-disks and cans thereon, whereby solder may be applied to the cans, and cooling means, substantially as described.

12. In combination with a revolving table carrying a series of can-carriers, vertically-movable can-seats for the cans, means for lifting said seats, and solder devices having a solder-directing tube above the level of the can-carrier and in line with the edge of the can when lifted by its seat, substantially as described.

13. In combination, the movable table, the can-seats thereon, arranged to be raised and lowered, the can-holders and devices for raising and lowering them, solder-feeding devices, a device for raising the can-seats at the position of the said solder-feeding devices, the said can-seats and cans being arranged to drop back automatically after passing said devices, and a second device for elevating the seats and cans for cooling the latter, substantially as described.

In testimony whereof I have signed my name to this specification in the presence of two subscribing witnesses.

JOHN SOLTER.

Witnesses:
 FELIX R. SULLIVAN,
 JAMES C. G. UNDUCH.